United States Patent Office 3,329,638
Patented July 4, 1967

3,329,638
MULTILAYERED POLYMERIC LATICES WITH HYDROPHILIC SURFACE LAYER
Randolph C. Blyth, Bellevue, Wash., assignor to Monsanto Company, a corporation of Delaware
No Drawing. Filed Sept. 5, 1963, Ser. No. 306,682
11 Claims. (Cl. 260—29.6)

This invention relates to novel polymeric latices and more particularly relates to polymeric latices suitable for use in opacifying liquid detergents which are to be maintained at a pH of about 6–8.

It is known that clear, liquid detergents which are maintained at an alkaline pH can be opacified by adding certain polymeric latices thereto, that the opacified detergents have a milky, smooth appearance which is generally regarded as aesthetically superior to the appearance of clear detergents, and that best results in opacifying the detergents are obtained when the polymeric latices have a large particle size, i.e., at least about 0.2 micron in diameter. Difficulties have been encountered in achieving comparable opacification of liquid detergents which are maintained at a pH of about 6–8: polymeric latices which are suitable for opacifying the more alkaline liquids are unstable in liquid detergents at this pH range, and polymeric latices having a large particle size are also usually unstable in these detergents.

An object of this invention is to provide novel polymeric latices.

Another object is to provide polymeric latices suitable for use in opacifying liquid detergents which are to be maintained at a pH of about 6–8.

Another object is to provide polymeric latices having an average particle size of about 0.17–0.3 micron in diameter and suitable for use in opacifying liquid detergents which are to be maintained at a pH of about 6–8.

A further object is to provide a process for preparing these polymeric latices.

These and other objects are attained by successively emulsion polymerizing at least two separate emulsion-polymerizable monomer charges, the penultimate of which comprises an alpha, beta-ethylenically unsaturated carboxylic acid and the last of which comprises an amine of the group consisting of secondary and tertiary amines containing vinylidene unsaturation, in such proportions that the monomers which polymerize to contribute the final 0.01 micron increase to the diameters of the resultant interpolymer particles comprise at least about 2.5 mol percent of the acid and at least about 4.5 mol percent of the amine in a ratio of about 0.4–1.3 mols of acid/mol of amine.

The following examples are given to illustrate the invention and are not intended as a limitation thereof. Unless otherwise specified, quantities mentioned are quantities by weight.

For convenience, the interpolymer particles of the latices of these examples are described as apparently consisting of a core surrounded by a shell, in accordance with the theory that the monomers polymerized during the final stages of polymerization form a shell around a core formed by the monomers polymerized during the earlier stages of polymerization. To a certain extent, this theory is substantiated by the facts that the monomers having the functional acid and amine groups must constitute a minimum amount of the critical final stage of polymerization in order for the latices to be stable in liquid detergents at a pH of about 6–8 and that exposure of these functional groups at or near the surfaces of the interpolymer particles would be expected to be necessary in order for them to affect latex stability. However, since it is possible that this theory is incorrect, it should be understood that description of the interpolymer particles as core-shell particles is made simply for convenience and that a "shell" having an estimated thickness of $x$ micron is that portion formed by the monomers which polymerize to contribute the final $2x$ micron increase to the diameters of the interpolymer particles.

*Example I*

Prepare an aqueous latex from the following formulation:

| Ingredient: | Parts |
|---|---|
| Kettle charge: | |
| Water | 5150 |
| Alkylaryl sulfonate | 40 |
| Tetrasodium pyrophosphate | 2 |
| Potassium persulfate | 1.7 |
| Catalyst charge: | |
| Water | 600 |
| Potassium persulfate | 22.7 |
| Emulsifier charge I: | |
| Water | 150 |
| Alkylaryl sulfonate | 150 |
| Emulsifier charge II: | |
| Water | 157 |
| Nonylphenol-ethylene oxide condensate | 63 |
| Emulsifier charge III: | |
| Water | 80 |
| Sodium lauryl sulfate | 20 |
| Monomer charge I: | |
| Styrene | 3026 |
| Methacrylic acid | 62 |
| Monomer charge II: | |
| Styrene | 449 |
| Methacrylic acid | 39 |
| Monomer charge III: | |
| Styrene | 410 |
| Dimethylaminoethyl methacrylate | 78 |

Heat the kettle charge to reflux temperature with agitation. Begin adding Monomer charge I to the reaction vessel and then, after about 5 minutes, begin adding the catalyst charge. Continue to add the catalyst charge throughout the reaction. About 15 minutes after beginning the reaction, discontinue adding Monomer charge I for about 20 minutes and then resume continuous addition of the charge for about 50 minutes. Begin adding Emulsifier charge I at the same time as resuming addition of Monomer charge I and continue adding the emulsifier for 80 minutes. About 15 minutes after completing the addition of Monomer charge I, begin adding Monomer charge II at a constant rate over a period of 17 minutes. After completing the addition of Monomer charge II, add Emulsifier charge II and then, after about 13 minutes, beginn adding Monomer charge III at a constant rate over a period of 25 minutes. Add Emulsifier charge III after completing the addition of Monomer charge III and continue refluxing for about 25 minutes. Cool the latex and adjust its pH to about 10 with 145 parts of ammonium hydroxide.

The product of the reaction (Latex A) is an aqueous latex of interpolymer particles averaging about 0.2 micron in diameter and apparently consisting of a styrene-methacrylic acid copolymer core surrounded by a shell having an estimated thickness of about 0.008 micron and consisting of chemically-combined styrene, methacrylic acid, and dimethylaminoethyl methacrylate. The shell comprises about 4.9 percent of combined methacrylic acid and about 5.4 mol percent of combined dimethylaminoethyl methacrylate.

*Example II*

Test the stability of Latex A in liquid detergents maintained at a pH in the range of about 6–8 by diluting aliquots of the latex to 4–8% solids, adding these diluted aliquots with agitation to various clear, liquid detergents (designated as Detergents A–E) to form opacified detergents containing about 0.4–1.0% latex solids, and maintaining the opacified detergents at various temperatures for various lengths of time to determine when the opacifieed detergents show the first sign of instability of the latex therein.

The results of the tests are shown below. In this tabulation, a plus sign following an integer simply indicates that there is still no flocculation or other sign of instability at the end of the indicated number of days allowed for that particular test. A latex is regarded as having sufficiently good stability for use in opacifying detergents when it is stable in the detergent for at least 7 days at 145° F. or at least 30 days at 125° F.

| Sample | Detergent | pH | Temperature | Days to Instability |
| --- | --- | --- | --- | --- |
| 1 | A | 6.2 | Ambient | 25+ |
| 2 | A | 6.2 | 125° F | 25+ |
| 3 | A | 6.2 | 145° F | 25+ |
| 4 | B | 6.3 | Ambient | 25+ |
| 5 | B | 6.3 | 125° F | 25+ |
| 6 | B | 6.3 | 145° F | 25+ |
| 7 | C | 6.3 | Ambient | 133+ |
| 8 | C | 6.3 | 125° F | 133 |
| 9 | C | 6.3 | 145° F | 25 |
| 10 | C | 7.0 | Ambient | 133+ |
| 11 | C | 7.0 | 125° F | 116 |
| 12 | C | 7.0 | 145° F | 15 |
| 13 | D | 6.3 | Ambient | 115+ |
| 14 | D | 6.3 | 125° F | 115+ |
| 15 | D | 6.3 | 145° F | 35 |
| 16 | D | 7.0 | Ambient | 115+ |
| 17 | D | 7.0 | 125° F | 107 |
| 18 | D | 7.0 | 145° F | 21 |
| 19 | E | 6.3 | Ambient | 113+ |
| 20 | E | 6.3 | 125° F | 84 |
| 21 | E | 6.3 | 145° F | 19 |
| 22 | E | 6.9 | Ambient | 113+ |
| 23 | E | 6.9 | 125° F | 57 |
| 24 | E | 6.9 | 145° F | 10 |

*Example III*

Prepare eleven latices by essentially repeating the procedure of Example I except for employing a Monomer charge I consisting of styrene, a Monomer charge II consisting of a mixture of styrene and methacrylic acid, and a Monomer charge III consisting of a mixture of styrene and dimethylaminoethyl methacrylate in such proportions that Monomer charges I, II, and III respectively constitute 80%, 10% and 10% of the total monomer, and methacrylic acid (MAA) and dimethylaminoethyl methacrylate (DMAEMA) constitute the below-indicated mol percentages of the "shell"-forming monomers, i.e., Monomer charges II and III:

|  | MAA | DMAEMA |
| --- | --- | --- |
| Latex B | 2.5 | 5.4 |
| Latex C | 2.5 | 6.8 |
| Latex D | 3.7 | 4.7 |
| Latex E | 3.7 | 6.1 |
| Latex F | 4.9 | 5.4 |
| Latex G | 6.1 | 4.7 |
| Latex H | 6.2 | 6.1 |
| Latex I* | 2.5 | 4.0 |
| Latex J* | 3.6 | 2.0 |
| Latex K* | 4.9 | 2.7 |
| Latex L* | 7.3 | 4.0 |

*Control.

The product of each of the reactions is an aqueous latex of interpolmer particles averaging about 0.2 micron in diameter and apparently consisting of a polystyrene core surrounded by a shell having an estimated thickness of about 0.007 micron and consisting of chemically-combined styrene, methacrylic acid, and dimethylaminoethyl methacrylate.

When tested for stability in liquid detergents as in example II, Latices B–H show stability of at least 7 days at 145° F. and at least 30 days at 125° F. in detergents maintained at a pH of about 6–8. Latices I–L, on the other hand, do not meet these minimum stability requirements.

Other latices which are stable in liquid detergents maintained at a pH of about 6–8 include, e.g.:

(1) an aqueous latex of interpolymer particles averaging about 0.25 micron in diameter and apparently consisting of a styrene-methacrylic acid copolymer core incompletely covered by a shell having an estimated thickness of about 0.002 micron and consisting of chemically-combined styrene and dibutylaminoethyl methacrylate, the outer 0.005 micron thicknesses of the particles comprising about 4.9 mol percent of combined methacrylic acid and about 5.4 mole percent of combined dibutylaminoethyl methacrylate, (2) an aqueous latex of interpolymer particles apparently consisting of a polyvinyl chloride core surrounded by a shell having an estimated thickness of about 0.005 micron and consisting of chemically-combined vinyl chloride, acrylic acid, and dimethylaminoethyl methacrylate, the respective acid and amine contents of the shell being about 3.7 and 4.7 mol percent, (3) an aqueous latex of interpolymer particles apparently consisting of a butadiene-styrene copolymer core surrounded by a shell having an estimated thickness of about 0.006 micron and consisting of chemically-combined styrene, methacrylic acid, and t-butylaminoethyl methacrylate, the respective acid and amine contents of the shell being about 6.1 and 4.7 mol percent, and (4) an aqueous latex of interpolymer particles apparently consisting of a polymethyl methacrylate core surrounded by a shell having an estimated thickness of about 0.007 micron and consisting of chemically-combined methyl methacrylate, methacrylic acid, and dimethylaminoethyl acrylate, the respective acid and amine contents of the shell being about 4.9 and 5.4 mol percent.

The products of the invention are aqueous latices prepared by successively emulsion polymerizing at least two separate emulsion-polymerizable monomer charges, the penultimate of which comprises an alpha, beta-ethylenically unsaturated carboxylic acid and the last of which comprises an amine of the group consisting of secondary and tertiary amines containing vinylidene unsaturation, in such proportions that the monomers which polymerize to contribute the final 0.01 micron increase to the diameters of the resultant interpolymer particles comprise at least about 2.5 mol percent of the acid and at least about 4.5 mol percent of the amine in a ratio of about 0.4–1.3 mols of acid/mol of amine. These latices preferably have an average particle size of at least about 0.17 micron in diameter, ordinarily about 0.17–0.3 micron or—more preferably—about 0.17–0.22 micron, and are suitable for use in opacifying liquid detergents, which are to maintained at a pH in the range of about 6–8.

Polymerization can be conducted by conventional emulsion polymerization techniques, i.e., at temperatures in the range of about 30–150° C. under subatmospheric, atmospheric, or superatmospheric pressure, using conventional free radical polymerization initiators, emulsifying agents, and—if desired—aids such as buffers, particle size regulators, activators, etc. Ordinarily, the amount of water employed is such that the latices have solids contents in the range of about 35–45%. Care should be taken to assure complete polymerization of the monomer charge comprising the acid prior to the addition of the charge comprising the amine to avoid coagulation.

In the preparation of the latices of the invention, the monomer charges can be proportioned so that only the monomers which polymerize to contribute the final 0.01 micron increase to the diameters of the interpolymer particles comprise at least about 2.5 mol percent of the acid and at least about 4.5 mol percent of the amine or so that a greater amount of total monomer, e.g., the monomers which polymerize to contribute the final 0.012–0.016 micron increase to the diameters, comprise these minimum amounts of acid and amine. When the monomer charges are proportioned so that more than the monomers which polymerize to contribute the final 0.01 micron increase to the diameters comprise the required amounts of acid and amine, care should be taken to employ a small enough final charge comprising the amine to assure the presence of a sufficient amount of acid in that amount of total monomer which polymerizes to contribute the final 0.01 micron increase to the diameters.

As will be obvious to those skilled in the art, the amount of monomer which should be included in each of the last two monomer charges in order to contribute a particular final increase to the diameter of a particle varies with the particle size of the interpolymer, e.g., the final 0.01 micron increase to the diameter of a particle having a final diameter of 0.2 micron is contributed by the last 15% of the monomers charged to the polymerization system, whereas the final 0.01 micron increase to the diameter of a particle having a final diameter of 0.3 micron is contributed by the last 10% of the monomers charged. Thus, in any particular case, the average particle size obtained by the particular emulsion polymerization technique being employed should be the basis for determining the amount of monomer to include in each of the last two monomer charges.

The acid employed as a component of the penultimate monomer charge can be any polymerizable alpha, beta-ethylenicaly unsaturated carboxylic acid but is preferably a monocarboxylic acid such as acrylic, methacrylic, cinnamic, atropic, or crotonic acid. Other utilizable acids include, e.g., maleic acid, itaconic acid, half esters of maleic and fumaric acids, suh as the methyl, butyl, and dodecyl acid maleates and fumarates, etc. Mixtures of such acids can be employed if desired.

The amine employed as a component of the last monomer charge can be any secondary or tertiary amine containing vinylidene unsaturation but is preferably a tertiary amine. Exemplary of utilizable amines are the alkyl and dialkylaminoalkyl acrylates and methacrylates, such as methylaminoethyl (meth)acrylate, t-butylaminoethyl (meth)acrylate, dimethylaminoethyl (meth)acrylate, dimethylaminopropyl (meth)acrylate, diethylaminoethyl (meth)acrylate, dibutylaminoethyl (meth)acrylate, etc.; vinyl pyridines, such as 4-vinylpyridine, 2-methyl-5-vinylpyridine, 2,4-diethyl-5-vinylpyridine, etc.; N-alkyl- and N,N-dialkylaminostyrenes, such as N-methylaminostyrene, N,N-dimethylaminostyrene, N,N-diethylaminostyrene, N.N-dipropylaminostyrene, etc., and mixtures thereof.

The acid and amine are employed in such amounts that the monomers which polymerize to contribute the final 0.01 micron increase to the diameters of the interpolymer particles comprise at least about 2.5 mol per cent of the acid and at least about 4.5 mol percent of the amine in a ratio of about 0.4–1.3 mols of acid/mol of amine. Ordinarily, the amounts employed are such that this critical final portion of the monomers charged to the polymerization system comprises about 2.5–6.2, preferably about 4.5–5.5, mol percent of the acid and about 4.7–6.8, preferably about 4.7–5.5, mol percent of the amine. Larger amounts of acid and amine can be employed if desired but will usually be found to be superfluous and can lead to the formation of latices having unduly high viscosities if employed in such large amounts that the monomers which polymerize to contribute the final 0.01 micron increase to the diameters of the interpolymer particles comprise more than about 20 mol percent of the acid.

Since it is the functional groups of the acid and amine in that portion of the monomer charge which polymerizes to contribute the final 0.01 micron increase to the diameters of the interpolymer particles that make the latices of the invention stable in liquid detergents at a pH in the range of about 6–8, the remainder of the chemical composition of the interpolymer is not critical, except, of course, that it must be formed from an emulsion-polymerizable monomer or mixture of monomers interpolymerizable with the acid and amine. Emulsion-polymerizable vinylidene monomers suitable for use as the remaining components of the penultimate and final monomer charges and as components of any previous monomer charges include, e.g., mono- and diolefins, such as ethylene, propylene, isobutylene, butadiene, isoprene, etc.; vinyl esters, such as vinyl acetate, vinyl stearate, vinyl benzoate, etc.; vinyl halides, such as vinyl chloride, vinyl bromide, etc.; vinylidene halides, such as vinylidene chloride, etc.; esters of acrylic-type acids with $C_1$–$C_{18}$ monohydric alcohols, such as methyl acrylate, methyl alpha-chloroacrylate, butyl acrylate, benzyl acrylate, dodecyl acrylate, the corresponding methacrylates, etc.; monovinylidene aromatic hydrocarbons and ar-alkyl and ar-halo derivatives thereof, such as styrene, vinyl naphthalene, alpha-methylstyrene, o-,m-, and -p-methylstyrenes, alpha-methyl-p-methylstyrene, p-t-butylstyrene, 2,4-dimethylstyrene, o-, m-, and p-chlorostyrenes, 2,5-dichlorostyrene, 2-methyl-4-chlorostyrene, etc.; mixture thereof with one another and mixtures thereof with copolymerizable materials such as acrylamide, methacrylamide, acrylonitrile, methacrylonitrile, $C_1$–$C_{18}$ monohydric alcohol diesters of maleic and fumaric acids, e.g., diethyl maleate, dibutyl fumarate, etc.

When more than two monomer charges are successively polymerized in the practice of the invention, an alpha, beta-ethylenically unsaturated carboxylic acid can be a component of previous emulsion-polymerizable monomer charges as well as of the penultimate monomer charge, but a secondary or tertiary amine containing vinylidene unsaturation should not be included in any charge prior to the final monomer charge because a latex cannot otherwise be formed.

Acording to a preferred embodiment of the invention, the interpolymer particles of the latices average about 0.17–0.3 micron, usualy about 0.17–0.22 micron in diameter, and the monomers which polymerize to contribute the final 0.01 micron increase to the diameters of the interpolymer particles comprise at least about 2.5 mol percent of the acid, at least about 4.5 mol percent of the amine, and at least about 85 mol percent of a monovinylidene aromatic hydrocarbon, the mol ratio of acid to amine being in the range of about 0.4:1 to about 1.3:1. Of these preferred latices, particularly preferred are those obtained when the monomers which polymerize to contribute the final 0.01–0.016 micron increase to the diameters of the interpolymer particles consist essentially of about 2.5–6.2 mol percent of the acid, about 4.7–6.8 mol percent of the amine, and about 87.0–92.8 mol percent of the monovinylidene aromatic hydrocarbon, and the earlier-polymerized monomer comprises at least a predominant amount of a monovinylidene aromatic hydrocarbon, e.g., styrene alone or in admixture with a lesser amount of methacrylic acid, etc.

The latices of the invention are particularly useful as opacifiers for liquid detergents which are to be maintained at a pH in the range of about 6–8. In this application, the amount of latex employed varies, e.g., with the degree of opacification desired but is usually such as to give a composition containing about 0.4–2% latex solids. Prior to use in this and other applications, the latices are usually stored at a pH of about 9.0–10.5.

It is obvious that many variations can be made in the products and processes set forth above without departing from the spirit and scope of this invention.

What is claimed is:

1. A process for the preparation of polymer particles comprising:
   (I) first polymerizing a core comprising the emulsion polymerized product of at least one monomer selected from the group consisting of styrene, methacrylic acid, vinyl chloride, butadiene, alkyl acrylates and alkyl methacrylates, wherein the alkyl group contains from 1 to 6 carbon atoms;

(II) secondly, after the polymerization of the core is substantially complete, polymerizing a penultimate layer, onto the core, wherein the penultimate layer comprises the emulsion polymerized product of at least one alpha, beta-ethylenically unsaturated carboxylic acid selected from the group consisting of acrylic, methacrylic, cinnamic, atropic, crotonic, maleic, itaconic and fumaric acids, and the half esters of maleic and fumaric acids; and (III) after the polymerization of the penultimate layer is substantially complete, polymerizing an ultimate layer onto the core/penultimate layer formed from (I) and (II) above, wherein the ultimate layer comprises the emulsion polymerized product of at least one emulsion polymerizable amine selected from the group consisting of monoamino alkyl acrylate, diaminoalkyl acrylates, monoaminoalkyl methacrylates, diaminoalkyl methacrylates, vinyl pyridines, N-alkylaminostyrene and N,N-dialkylaminostyrenes; and wherein any comonomers used are selected from the group consisting of styrene, methacrylic acid, vinyl chloride, butadiene, alkyl acrylates and alkyl methacrylates, wherein the alkyl group contains from 1 to 6 carbon atoms;

wherein the process comprises polymerizing the monomers in such proportions that said ultimate layer (III) is less than 0.005 micron in thickness, and wherein the final 0.01 micron increase to the diameter of the resultant interpolymer particles comprises an outermost portion consisting of ultimate layer (III) and penultimate layer (II) such that the composition of the outermost portion comprises from about 2.5 to about 6.2 mol percent of the acid and from about 4.5 to about 6.8 mol percent of the amine in a ratio of from about 0.4 to 1.3 mols of acid to mol of amine.

2. The process of claim 1 wherein the amine is a tertiary amine.

3. The process of claim 1 wherein the acid is methacrylic acid and the amine is dimethylaminoethyl methacrylate.

4. A two stage process for the preparation of polymer particles comprising:

(I) first polymerizing a core comprising the emulsion copolymerized product of at least one monomer selected from the group consisting of styrene, vinyl chloride, butadiene, alkyl acrylates, and alkyl methacrylates wherein the alkyl group contains from 1 to 6 carbon atoms, and at least one alpha, beta-ethylenically unsaturated carboxylic acid monomer selected from the group consisting of acrylic, methacrylic, cinnamic, atropic, crotonic, maleic, itaconic and fumaric acids and the half esters of maleic and fumaric acids; and (II) secondly, after the polymerization of the core is substantially complete, polymerizing an ultimate layer onto the core formed in (I) above, wherein the ultimate layer comprises the emulsion polymerized product of at least one emulsion polymerizable amine selected from the group consisting of monoamino alkyl acrylates, diaminoalkyl acrylates, monoaminoalkyl methacrylates, diaminoalkyl methacrylates, vinyl pyridines, N-alkylaminostyrene and N,N-dialkylaminostyrenes; and wherein any comonomers used are selected from the group consisting of styrene, methacrylic acid, vinyl chloride, butadiene, alkyl acrylates, and alkyl methacrylates, wherein the alkyl group contains from 1 to 6 carbon atoms;

wherein the process comprises polymerizing the monomers in such proportions that the ultimate layer (II) is less than 0.005 micron in thickness, and wherein the final 0.01 micron increase to the diameter of the resultant interpolymer particles comprises an outermost portion consisting of ultimate layer (II) and the core (I) such that the composition of the outermost portion comprises from about 2.5 to about 6.2 mol percent of the acid and from about 4.5 to about 6.8 mol percent of the amine in a ratio of from about 0.4 to 1.3 mols of acid to mol of amine.

5. The process of claim 2, wherein styrene and methacrylic acid are used to form the core and wherein styrene and dimethylaminomethacrylate are used to form the ultimate layer.

6. An aqueous latex of interpolymer particles comprising:

(I) a core comprising the emulsion polymerized product of at least one monomer selected from the group consisting of styrene, methacrylic acid, vinyl chloride, butadiene, alkyl acrylates and alkyl methacrylates, wherein the alkyl group contains from 1 to 6 carbon atoms;

(II) a penultimate layer, polymerized onto the core, comprising the emulsion polymerized product of at least one alpha, beta-ethylenically unsaturated carboxylic acid selected from the group consisting of acrylic, methacrylic, cinnamic, atropic, crotonic, maleic, itaconic and fumaric acids, and the half esters of maleic and fumaric acids; and (III) an ultimate layer, polymerized onto the core/penultimate layer formed from (I) and (II) above, wherein the ultimate layer comprises the emulsion polymerized product of at least one emulsion polymerizable amine seelcted from the group consisting of monoamino alkyl acrylates, diaminoalkyl acrylates, monoaminoalkyl methacrylates, diaminoalkyl methacrylates, vinyl pyridines, N-alkylaminostyrene and N,N-dialkylaminostyrenes; and wherein any comonomers used are selected from the group consisting of styrene, methacrylic acid, vinyl chloride, butadiene, alkyl acrylates and alkyl methacrylates, wherein the alkyl group contains from 1 to 6 carbon atoms;

wherein said ultimate layer (III) is less than 0.005 micron in thickness, and wherein the outermost 0.005 micron portion of the resultant interpolymer particles comprises ultimate layer (III) and penultimate layer (II) and wherein the composition of this outermost 0.005 micron portion comprises from about 2.5 to about 6.2 mol percent of the acid and from about 4.5 to about 6.8 mol perecnt of the amine in a ratio of from about 0.4 to 1.3 mols of acid to mol of amine.

7. The aqueous latex of claim 6 wherein the interpolymer particles average about 0.17–0.3 micron in diameter.

8. A composition having a pH of about 6–8 and comprising a liquid detergent and an opacifying amount of the aqueous latex of claim 6.

9. An aqueous latex of intepolymer particles comprising:

(I) a core comprising the emulsion copolymerized product of at least one monomer selected from the group consisting of styrene, vinyl chloride, butadiene, alkyl acrylates, and alkyl methacrylates wherein the alkyl group contains from 1 to 6 carbon atoms, and at least one alpha, beta-ethylenically unsaturated carboxylic acid monomer selected from the group consisting of acrylic, methacrylic, cinnamic, atropic, crotonic, maleic, itaconic and fumaric acids and the half esters of maleic and fumaric acids; and (II) an ultimate layer polymerized onto the core comprising the emulsion polymerized product of at least one emulsion polymerizable amine selected from the group consisting of monoamino alkyl acrylates, diaminoalkyl acrylates, monoaminoalkyl methacrylates, diaminoalkyl metacrylates, vinyl pyridines, N-alkylaminostyrene and N,N-dialkylamino-styrenes; and wherein any comonomers used are selected from the group consisting of styrene, methacrylic acid, vinyl chloride, butadiene, alkyl acrylates and alkyl methacrylates, wherein the alkyl group contains from 1 to 6 carbon atoms;

wherein said ultimate layer (II) is less than 0.005 micron in thickness, and wherein the outermost 0.005 micron portion of the resultant interpolymer particles comprises ultimate layer (II) and penultimate layer (I) and wherein the composition of this outermost 0.005 micron portion comprises from about 2.5 to about 6.2 mol percent of the acid and from about 4.5 to about 6.8 mol percent of the amine in a ratio of from about 0.4 to 1.3 mols of acid to mol of amine.

10. The aqueous latex of claim 9 wherein the interpolymer patricles averages about 0.17–0.3 micron in diameter.

11. A composition having a pH of about 6–8 and comprising a liquid detergent and an opacifying amount of the aqueous latex of claim 9.

References Cited
UNITED STATES PATENTS

| | | | |
|---|---|---|---|
| 3,099,636 | 7/1963 | Skiles | 260—29.6 |
| 3,108,979 | 10/1963 | Le Fevre et al. | 260—29.6 |

MURRAY TILLMAN, *Primary Examiner.*

P. LIEBERMAN, *Assistant Examiner.*